United States Patent
Lee (10) Patent No.: US 6,708,216 B1
(45) Date of Patent: Mar. 16, 2004

(54) CLOSED VIRTUAL NETWORK SYSTEM

(76) Inventor: Paul Lee, 14F, No. 28, Lane 150, Hsing-Yun Street, Taipei City (TW)

(*) Notice: Subject to any disclaimer, the term of this patent is extended or adjusted under 35 U.S.C. 154(b) by 714 days.

(21) Appl. No.: 09/669,404

(22) Filed: Sep. 23, 2000

(51) Int. Cl.[7] ............................................. G06F 15/16
(52) U.S. Cl. ..................... 709/229; 709/217; 709/218; 709/219; 709/223; 709/226
(58) Field of Search ................. 709/201, 202, 709/217, 218, 219, 226, 227, 228, 229; 707/3; 345/810

(56) References Cited

U.S. PATENT DOCUMENTS

| | | | |
|---|---|---|---|
| 6,009,410 A | * 12/1999 | LeMole et al. | 709/219 |
| 6,128,663 A | * 10/2000 | Thomas | 709/217 |
| 6,304,906 B1 | * 10/2001 | Bhatti et al. | 709/227 |
| 6,341,314 B1 | * 1/2002 | Doganata et al. | 709/229 |
| 6,438,576 B1 | * 8/2002 | Huang et al. | 709/202 |
| 6,442,577 B1 | * 8/2002 | Britton et al. | 709/218 |
| 6,463,457 B1 | * 10/2002 | Armentrout et al. | 709/201 |
| 6,542,933 B1 | * 4/2003 | Durst et al. | 709/226 |
| 6,542,964 B1 | * 4/2003 | Scharber | 709/228 |
| 6,583,797 B1 | * 6/2003 | Roth | 345/810 |
| 6,629,092 B1 | * 9/2003 | Berke | 707/3 |

* cited by examiner

*Primary Examiner*—Rupal Dharia
*Assistant Examiner*—Quang Nguyen (57) ABSTRACT

A closed virtual network system, the system connects via Internet with a plurality of ISP network stations (ISP) and a plurality of ICP network stations (ICP), and a plurality of information appliances (IA) are connected via a plurality of ISPs' with Internet. The system provides an integrated network resource service system between the aforesaid ISP network stations/ICP network stations and IA users, for the purpose of complete combining the two. Thus the integrated network resource service system can integrate demands between the resource network station/service network station and the users.

7 Claims, 7 Drawing Sheets

CLOSED VIRTUAL NETWORK SYSTEM

BACKGROUND OF THE INVENTION

1. Field of the Invention

The present invention is related to a system connecting with Internet, and especially to a closed virtual network system connecting with Internet.

2. Description of the Prior Art

Users of Internet take advantage of electric machines having the function of networking, and make connection with Internet via the Internet Service Provider. The users can obtain resources and services from Internet without limitation of countries, and can browse at will among thousands of network stations and join the intercommunicating activities such as electronic commerce, community activities on the thousands of network stations through Internet etc. Resources and services provided by Internet are countless; while the web sites owning the resources and services are not related with one another, hence users can not classify and recognize those identical or similar but countless resources and services through the sites. Thereby, there are searching engine networks or resources-and-services classifying network stations to provide desirable network stations which can get connection more conveniently for users. However, such searching engine networks or resources-and-services classifying network stations do not have the function of connection really wanted by the users who still need time to sift to obtain the expected connection of the network stations. And more, network stations providing resources and services pay enormous effort to give what users want and scramble for the users. But there are only meetings by chance between the network stations providing resources and services and the users; therefore, it is necessary to provide an integrating network for the resources and services and an integrated network resource service system for users, for the purpose of complete combining the two.

SUMMARY OF THE INVENTION

The present invention has an object to provide a network station for integrating resources and services and an integrated network resource service system for users on the Internet, for the purpose of complete combining the two.

The present invention has another object to provide an integrated central network station for integrating demands between the resource and service network station and users.

The third object of the present invention is to provide a closed virtual network system built on the Internet. By the feature of integrating, the system can render the network stations for closed type groups or clubs such as those under membership systems to get the value of capability of obtaining new members.

The fourth object of the present invention is to provide a closed virtual network system built on the Internet. The system can obtain the information of events of electric commercial trades of users proceeding on the network to develop applications of trading modes of various electric commercial trades.

To get these objects, the present invention provides a closed virtual network system, the system connects via Internet with a plurality of ISP network stations (ISP-Internet Service Provider) and a plurality of ICP network stations (ICP-Internet Content Provider), and a plurality of information appliances (LA) are connected via a plurality of ISPs' with Internet, the closed virtual network system includes: an integration central network station (IRP) connected with Internet and provided at least with an execution device for managing methods for the databases of the afore said ISP network stations, ICP network stations and IA users and with an execution device for managing methods for the databases of a plurality of web pages. Wherein, the managing methods of the IRP on the databases of the afore said ISP network stations, ICP network stations, IAs' and IA users include the following steps: registration of new joined ISPs', ICPs', IAs' and IA users; classifying into a plurality of groups for the attributes of resources provided by the ISPs', ICPs', so that each of the classified groups has a plurality of ISPs', ICPs' with identical attributes; updating the databases of the ISPs', ICPs', IAs' and IA users. The IAs' has at least a built-in browser's program code, a stored media reading device, an image and sound output device and a memory for storing the identification codes of the IAs' and IA users. Wherein, the web site of the homepage of IA is constantly set as the web site of the IRP network, otherwise, the IRP is further automatically switched to connect the web site of the homepage of IA with one web site from those of the ISPs', ICPs' of identical attributes in each of the aforesaid classified groups. The above stated built-in browser's program code includes at least a program code used in judging and dealing with the electric commercial trades proceeded by the IA users. Thereby, when the IA users make connections to Internet network, the homepage of IA can have the web site of the IRP network, or the web site from those of the ISPs', ICPs' after the IRP is automatically switched. And when the IA users proceed the electric commercial trades, the program code of the browser's program code of IA used in judging and dealing with the electric commercial trades proceeded by the IA users immediately executes and informs the IRP.

The present invention will be apparent in its objects and functions after reading the detailed description of the preferred embodiment thereof in reference to the accompanying drawings.

BRIEF DESCRIPTION OF THE DRAWINGS

FIG. 3C-1 is a table showing the information structure of the IAs' and IA users;

FIG. 3C-2 is an embodiment of the information structure of FIG. 3C-1;

FIG. 3D-1 shows an embodiment of a group of the network stations with the attribute of service for dial-up networking after being classified;

FIG. 3D-2 shows an embodiment of a group of the network stations with the attribute of clubs after being classified;

DETAILED DESCRIPTION OF THE PREFERRED EMBODIMENT

Figure 1:
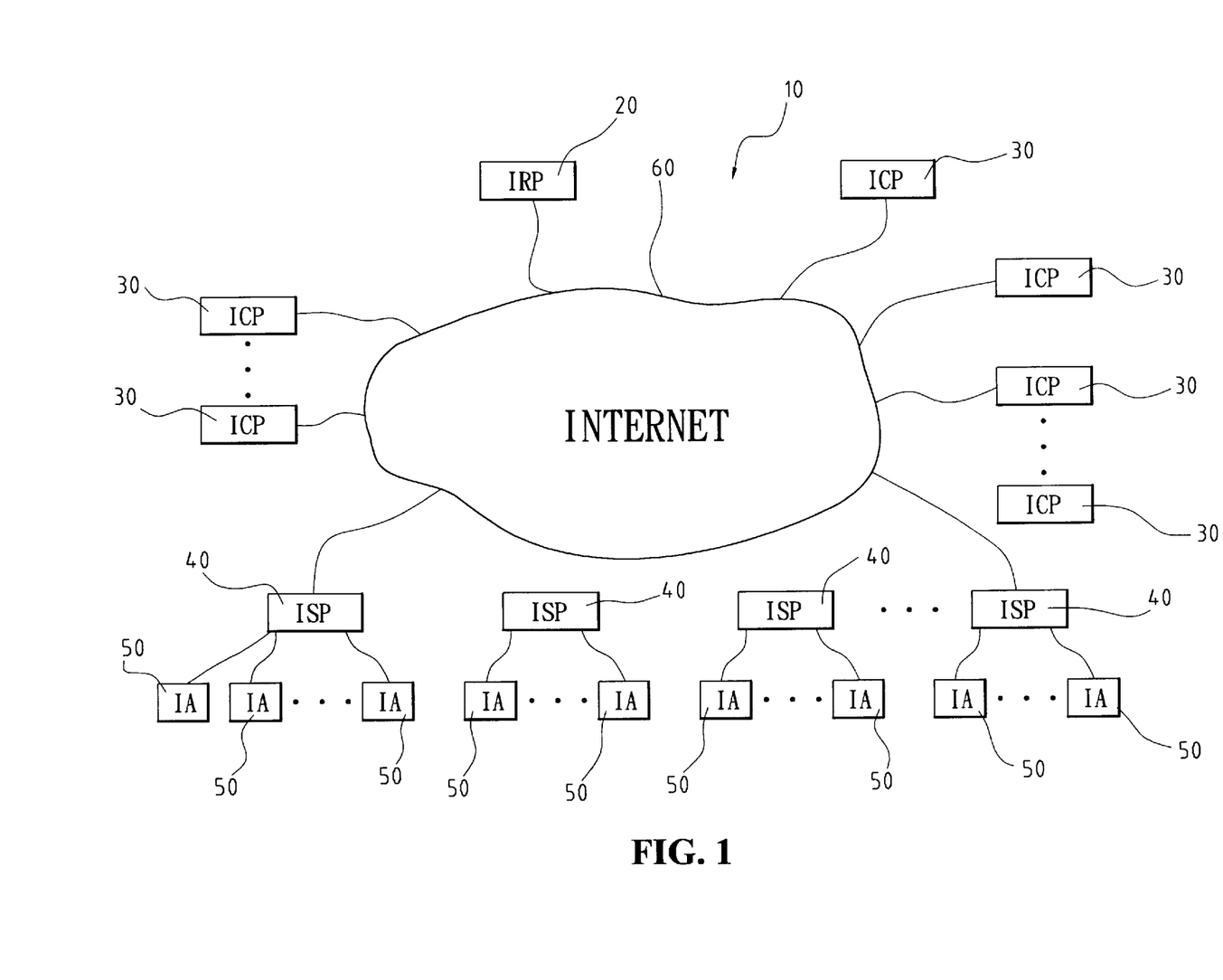
FIG. 1 is a schematic view of a closed virtual network system of the present invention under a network environment.

Referring to FIG. 1 which is a schematic view of a closed virtual network system 10 of the present invention under a network environment. The Internet 60 is connected with an IRP network station 20 (Internet & Integrations resource Plan & Provider), a plurality of ICP network stations 30 (Internet Content Provider), a plurality of ISP network stations 40 (Internet Service Provider) and a plurality of information appliances (IAs') 50 which are connected with Internet 60 via the ISP network stations 40. Wherein, the ICP network stations 30 are network stations for selling commodities, giving services of amusements, information searching engines, clubs or providing labor services etc. in the practical Internet. While the ISP network stations 40 in the practical Internet are network stations which can provide services of dial-up, broadband dial-up networking or cable networking.

The IRP network station 20 in FIG. 1 is provided at least with: an execution device for managing methods for the databases of the ISP network stations 40, ICP network stations 30, IAs' 50 and IA users and an execution device for managing methods for the databases of a plurality of web pages. In practice, the IRP network station 20 can be a presently commercially available computer as a work station of which a storing device, such as a hard disk, is used to store the databases of the ISP network stations 40, ICP network stations 30, IAs' 50 and IA users and the databases of the abovementioned web pages. The CPU of the computer in the work station is used to execute the abovementioned respect managing steps.

Figure 2A:
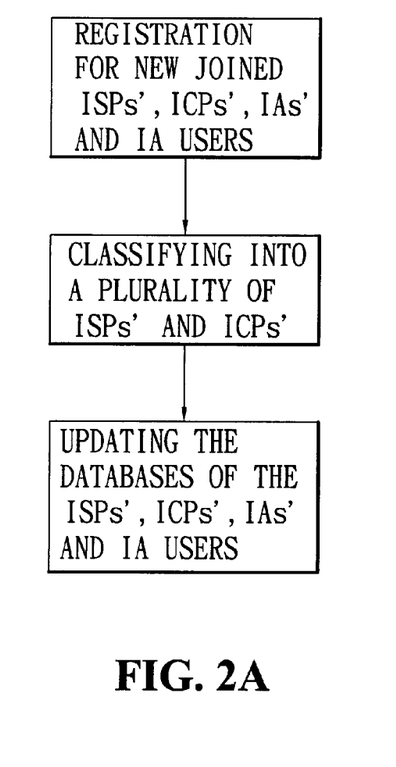
FIG. 2A is a flow chart showing managing of the databases of the ISP network stations, ICP network stations and IA users in the IRP network station.
Figure 3A:
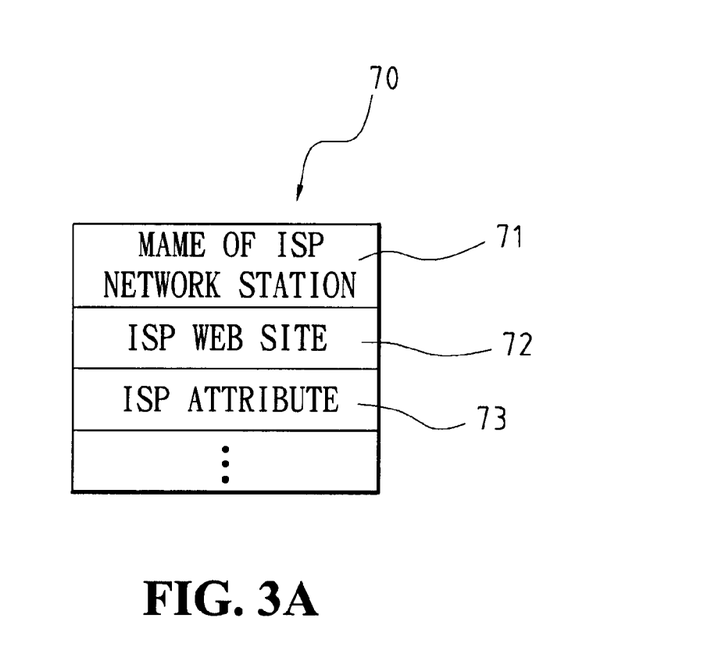
FIG. 3A is a table showing the information structure of the ISPs'.
Figure 3B:
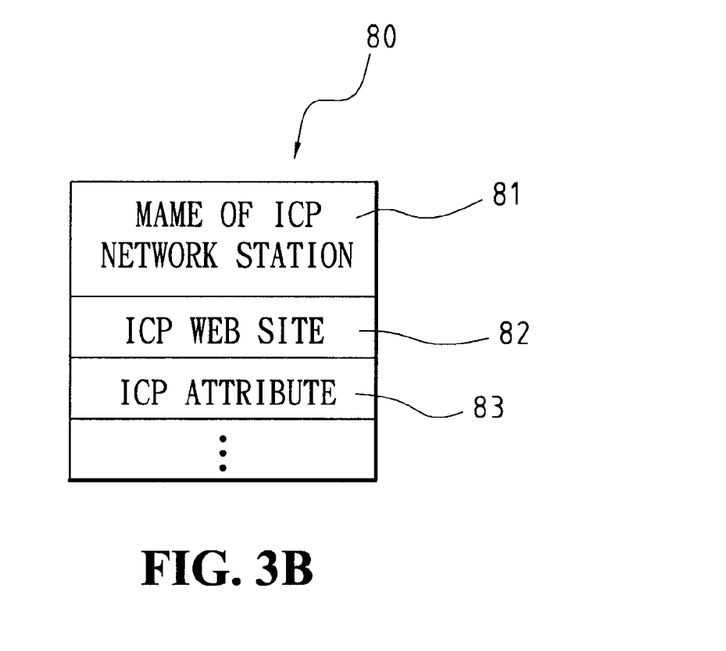
FIG. 3B is a table showing the information structure of the ICPs'.
Figure 3C:
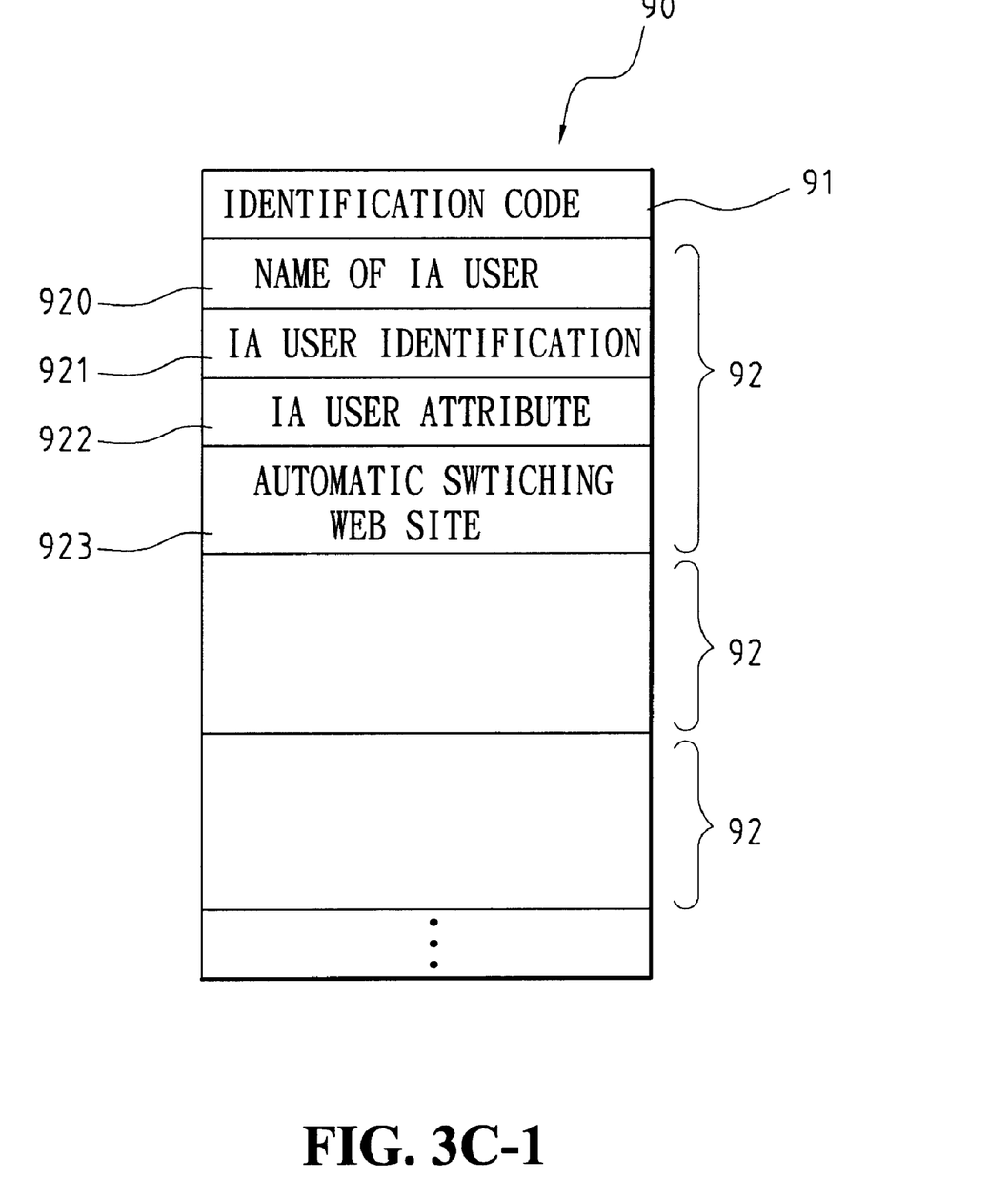

FIG. 2A is a flow chart showing managing of the ISPs', ICPs', IAs' and IA users in the IRP network station. The first step of the flow chart of FIG. 2A is registration of new joined ISPs', ICPs', IAs' and IA users, wherein, the structures of the ISP information 70, the ICP information 80, the identification code 91 of the IAs' and the information 92 of the IA users are shown respectively as in FIGS. 3A, 3B and 3C. The registration step registers the information of new joined ISPs', ICPs', IAs' and IA users in the above stated databases. Then a classifying step is done according to the attributes 73, 83 provided by the ISP information 70 and the ICP information 80 to get a plurality of groups, so that each of the classified groups has ISPs', ICPs' with identical attributes, such as those classified network station groups 100 with the attribute of service for dial-up networking as shown in FIG. 3D-1 and those classified network station groups 110 with the attribute of clubs as shown in FIG. 3D-2. The last one is an updating step, it is used to update the databases when the ISP information 70, the ICP information 80, the identification code 91 of the IAs' and the structure of the information 92 of the IA users are changed.

The structure of the ISP information 70 in FIG. 3A includes at least the fields for "name of ISP network station" 71, "ISP web site" 72, "ISP attribute" 73; wherein, the "name of network station" 71 is used to record names of network stations, for example, a name of a network station "A-ISP company". The "ISP web site" 72 is used to record web sites, they are web sites indicated by four numbers from "0" to "255", for example "168.95.0.1"; or can be web sites indicated by letters, for example indicated by letters www.aisp.com. The "ISP attribute" 73 can be a code composed of numbers or directly indicated by words such as "dial-up networking", in order to define its nature of dial-up networking, broadband networking or cable networking etc., and its nature of vending commodities, amusement, information searching engine, club, labor service providing etc. The structure of the ICP information 80 in FIG. 3B includes at least the fields for "name of ICP network station" 81, "ICP web site" 82 and "ICP attribute" 83. The definition of the fields for the ICP information 80 is similar to that of the definition of the fields for the above stated ISP information 70. For example, a name of an ICP network station 81 is "happy purchasing", the ICP web site 82 thereof is www.happygo.com, the ICP attribute 83 thereof is "network purchasing". Another example is, a name of an ICP network station 81 is "D golf club", the ICP web site 82 thereof is xd.xd.xd.xd, while the ICP attribute 83 thereof is "club". FIG. 3C-1 shows an information structure 90 for IAs' and IA users, the structure includes an IA identification code 91 and an IA user information 92. Wherein, the identification code 91 record individual information appliances IA. In practice, the numbers for the moment of production of the information appliances can be used as the identification code 91. And wherein, the IA user information 92 includes name of IA user 920, IA user identification 921, IA user attribute 922 and an automatic switching web site 923. FIG. 3C-2 shows an embodiment of the information structure for IAs' and IA users. The embodiment in FIG. 3C-2 explains that an IA with an identification code "1234567" has two users both use the IA with an identification code "1234567", one is "Mr. Junior Wang", the identification code thereof is "XXXXX", the attribute thereof is "club", the automatically switched web site 82 thereof is xd.xd.xd.xd; the other user is "Mr. Senior Wang", the identification code thereof is "YYYYY", the attribute thereof is "network purchasing", the automatically switched web site 82 thereof is www.happygo.com.

Figure 2B:
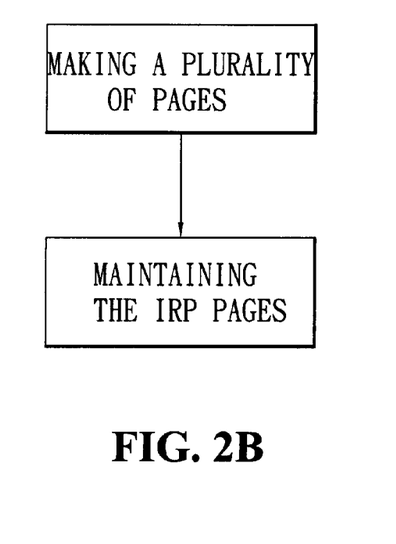
FIG. 2B is a flow chart showing managing of the databases of the pages in the IRP network station.

FIG. 2B is a flow chart showing managing of the databases of the pages in the IRP network station. The first step of the flow chart of FIG. 2B is making a plurality of pages, wherein, the pages at least include a page connecting with the web site of the homepage of IA, and the supervisor of the IRP network station can take advantage of the page producing software provided commercially to make pages. So that a plurality of IA users, ISP supervisors and ICP supervisors can make networking on the IRP network station to browse the pages of the IRP network station to do intercommunicating activities. And the final step is a maintaining step for updating the contents of the pages at any time.

Figure 4:
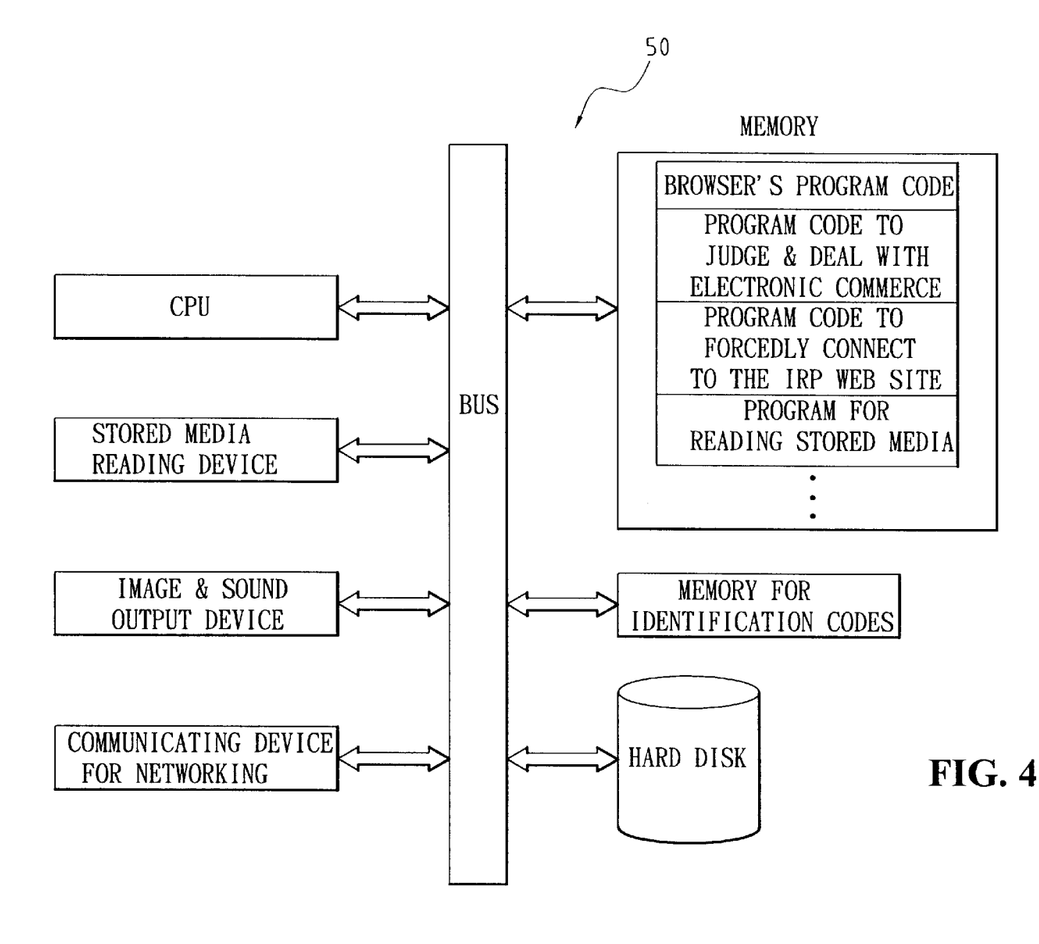
FIG. 4 is a schematic view showing the structure of the IA information appliance.

FIG. 4 shows the structure of the IA information appliance. The IA information appliance of the closed virtual network system of the present invention is provided at least with a built-in browser's program code, a stored media reading device, an image and sound output device and a memory for storing the identification codes of the IAs' and IA users. Wherein, the web site of the homepage of IA is constantly set as the web site of the IRP network, otherwise, the IRP is further automatically switched to connect the web site of the homepage of IA with one web site from those of the ISPs', ICPs' of identical attributes in each of the aforesaid classified groups. The above stated built-in browser's program code includes at least a program code used in judging and dealing with the electric commercial trades proceeded by the IA users. Thereby, when the IA users make connections to Internet network, the homepage of IA can have the web site of the IRP network, or the web site from those of the ISPs', ICPs' after the IRP is automatically switched. And when the IA users proceed the electric commercial trades, the program code used in judging and dealing with the electric commercial trades proceeded by the IA users of the browser's program code of IA immediately executes and informs the IRP. In practice, the hardware of the IA information appliance in FIG. 4 can take advantage of a personal computer available in the markets as a basis and can use it as a product applicable to the IA information appliance, such as the IA information appliance with the IBM compatible personal motherboard for Microsoft Window operation as a basis. Wherein, the stored media reading device is a CD ROM in practice, the image and sound output device can be a VGA card with a TV OUT and an MPEGI and MPEGII image and sound information decoding functions and a sound card for processing sound output. The web site of the homepage of IA is constantly set as the web site of the IRP network, in practice, when the information appliance IA is activated to execute the browser's program code, the browser's program code reads the files stored in the hard disk and recording the IRP web site, so that the information appliance IA gets the IRP web site when it is activated and connected for networking. The identification code memory of the IA is used to store the identification codes of the IAs' and the IA users; wherein, the identification codes of the IAs' can be the numbers for the moment of production of the information appliances, and the space of the identification code memory can be used to store at least one identification code of the IA users.

Figure 3C:
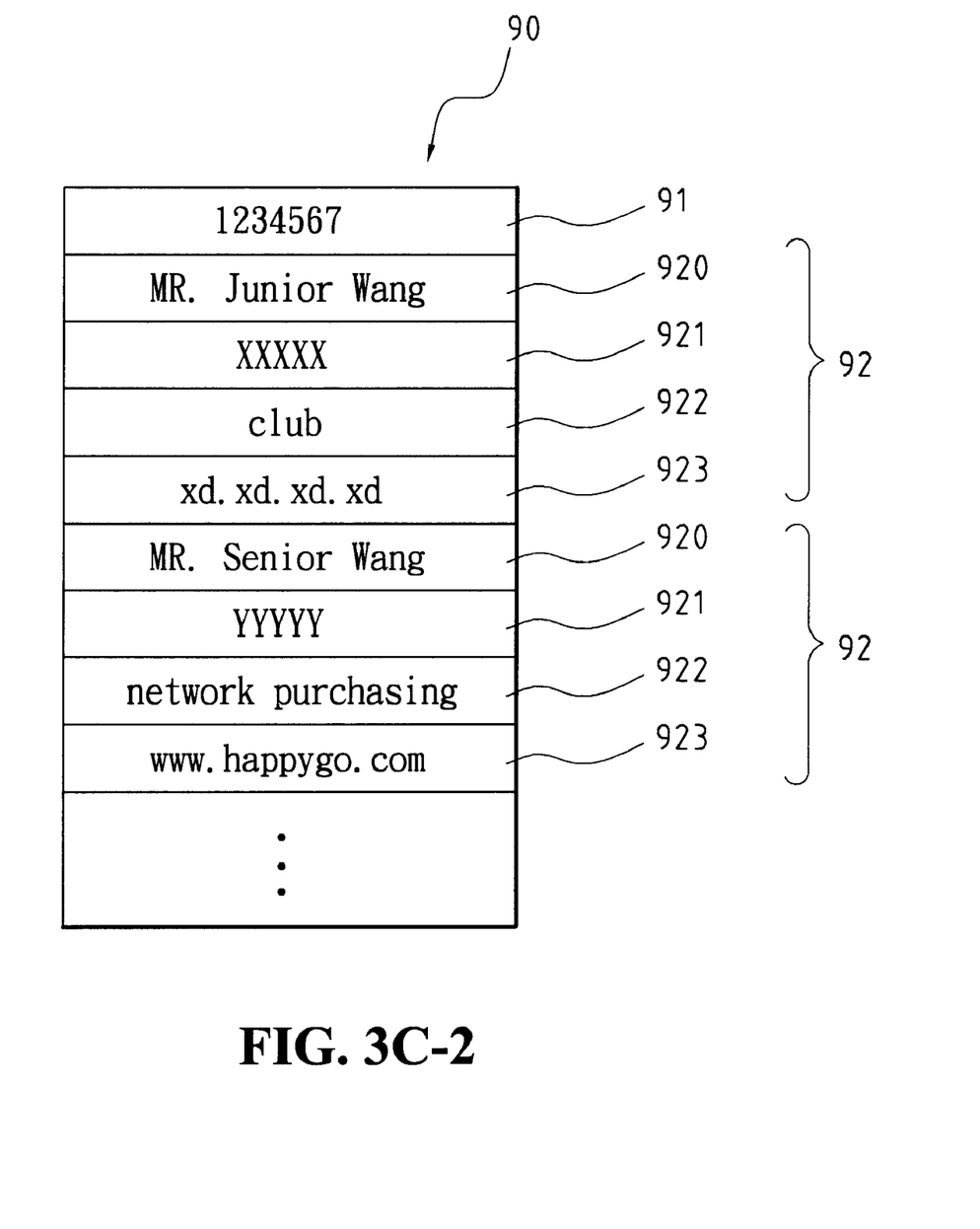
Figure 3D:
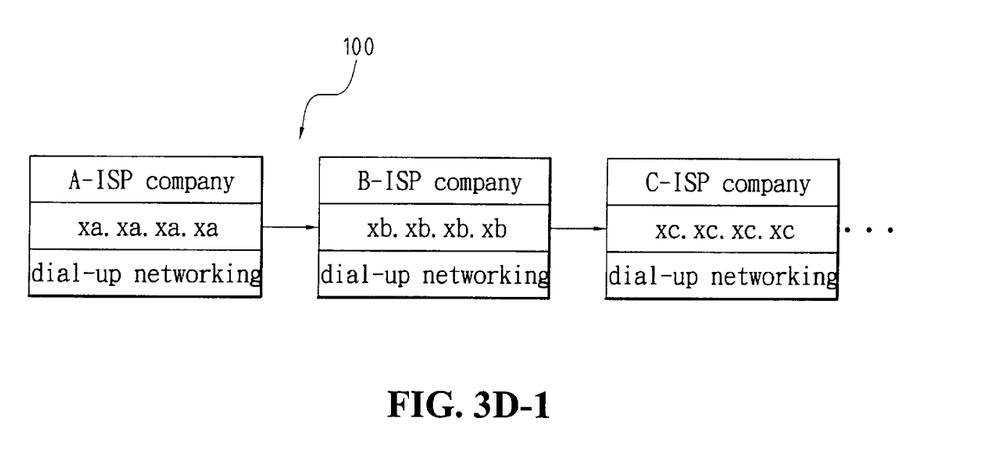
Figure 3D:
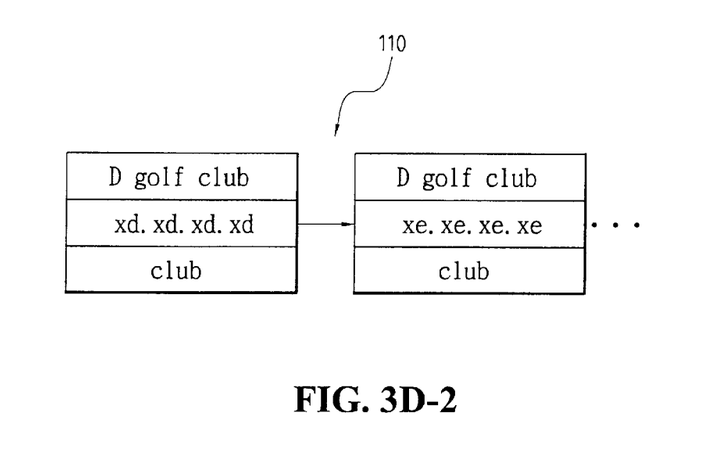

When a user of an information appliance IA 50 turns on the computer, the CPU executes the browser's program code in the memory, by virtue that the homepage of the information appliance IA 50 is the IRP web site, so that the page frame first seen is the IRP page, or is further automatically switched to the above stated one web site from those of the ISPs', ICPs' of identical attributes in each of the aforesaid classified groups through the IRP. For example, a "happy purchasing" network station or a "D golf club" network station. Wherein, the automatic switching is based on the information recorded in the information of the IAs' and IA users in the abovementioned IRP database, such as "Mr. Senior Wang". Referring to FIG. 3C-2, when turning on to use the information appliance IA 50, the page frame first seen is the IRP page, or is further automatically switched to the "happy purchasing" network station through the IRP.

The user of the information appliance IA 50 browses various network stations, wherein, when the user of the information appliance IA 50 proceeds the electric commercial trades, for example, the user "Mr. Senior Wang" is purchasing on the "happy purchasing" network station, the program code of the IA 50 used in judging and dealing with the electric commercial trades proceeded by the IA users immediately executes and further calls a program code to forcedly connect the IRP web site, so that the IRP web site obtains the information of the events of the electric commercial trades being proceeded by the IA 50 users. The purpose that the IRP web site obtains the information of the events of the electric commercial trades being proceeded by the IA 50 users on Internet is to further use the information of the events of the electric commercial trades for developing applicable modes for various electric commercial trades. For example, the user "Mr. Senior Wang" decides to purchase on the "happy purchasing" network station and to pay money, if there is a commercial agreement for cooperation between the IRP web site and the "happy purchasing" network station, the IRP web site can directly do the payment to the "happy purchasing" network station for the user "Mr. Senior Wang".

When the user of the information appliance IA 50 chooses a network station during browsing among various network stations, now if the stored media of the information of the network station, such as a video compact disk having introductions of all the commodities, is available, reading of the program codes of the stored media in the stored media reading device can be executed such as by playing the pictures of commodity introductions.

The above statement is only for illustrating a preferred embodiment of the present invention, and not for giving any limitation to the scope of the present invention. It will be apparent to those skilled in this art that all equivalent modifications and changes without departing from the spirit and principle of the present invention shall fall within the scope of the appended claims and are intended to form part of this invention.

What is claimed is:

1. A closed virtual network system, said system connects via Internet with a plurality of ISP network stations (ISP) and a plurality of ICP network stations (ICP), and a plurality of information appliances (IA) are connected via a plurality of ISPs' with said Internet, said closed virtual network system comprises:

an integration central network station (IRP) connected with said Internet and provided at least with an execution device for managing methods for the databases of said ISP network stations, ICP network stations and IA users and with an execution device for managing methods for the databases of a plurality of web pages;

wherein, said managing methods of said IRP on said databases of said ISP network stations, ICP network stations, IAs' and IA users include the following steps:

registration of new joined ISPs', ICPs', IAs' and IA users;

classifying into a plurality of groups for the attributes of resources provided by said ISPs', ICPs', so that each of said classified groups has a plurality of said ISPs', ICPs' with identical attributes;

updating said databases of said ISPs', ICPs', IAs' and IA users;

said IAs' has at least a built-in browser's program code, a stored media reading device, an image and sound output device and a memory for storing the identification codes of said IAs' and IA users; wherein, the web site of the homepage of said IA is constantly set as the web site of said IRP network, otherwise, said IRP is further automatically switched to connect said web site of said homepage of said IA with one web site from those of said ISPs', ICPs' of identical attributes in each of said classified groups, said built-in browser's program code includes at least a program code used in judging and dealing with the electric commercial trades proceeded by said IA users;

thereby, when said IA users make connections to said Internet network, said homepage of said IA is said web site of said IRP network, or said web site from those of said ISPs' and ICPs' after said IRP is automatically switched; and when said IA users proceed said electric commercial trades, said program code used in judging and dealing with said electric commercial trades proceeded by said IA users of said browser's program code of said IA immediately executes and informs said IRP.

2. A closed virtual network system as in claim 1, wherein, said classifying step is done according to the attributes provided by said ISP information and said ICP information, said attributes are those including an attribute of service for dial-up networking, broadband dial-up networking or cable networking or an attribute of selling commodities, giving services of amusements, information searching engines, clubs or providing labor services; thus a plurality of groups are obtained from classifying including the groups with said attribute of service for dial-up networking, broadband dial-up networking or cable networking or said attribute of selling commodities, giving services of amusements, information searching engines, clubs or providing labor services.

3. A closed virtual network system as in claim 1, wherein, said built-in browser's program code further includes a program code used to forcedly connect said IRP web site, and adapted for being called to judge and deal with said electric commercial trades proceeded by said IA users.

4. A closed virtual network system as in claim 1, wherein, said built-in browser's program code further includes a program code used to read said program codes of the stored media in said stored media reading device, and is used in judging and dealing with said electric commercial trades proceeded by said IA users.

5. A closed virtual network system as in claim 1, wherein, said managing methods for said databases of a plurality of web pages includes at least the step of producing a plurality of said web pages, wherein, said web pages includes at least a web page connecting with said web site of said homepage of said IA.

6. A closed virtual network system as in claim 5, wherein, said web page connecting with said web site of said homepage of said IA includes at least said one web site from those of said ISPs', ICPs' of identical attributes in each of said classified groups.

7. A closed virtual network system as in claim 1, wherein, said homepage of said IA further is automatically switched to connect a web site of from those of the ISPs', ICPs' of identical attributes in each of said classified groups through said IRP according to the information of said IA users.

* * * * *